June 20, 1950 — W. H. SIEBELS — 2,512,116
COMPOSITE PIPE STRUCTURE
Filed July 1, 1947
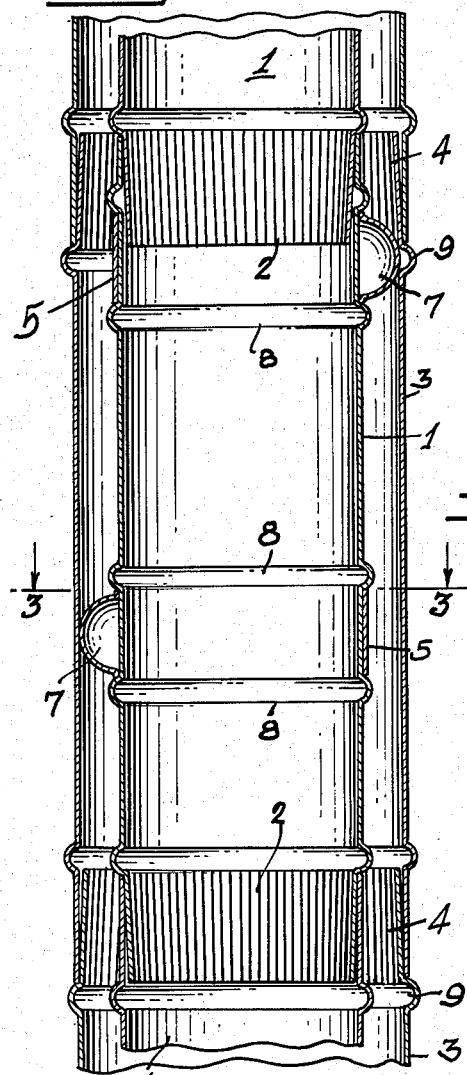
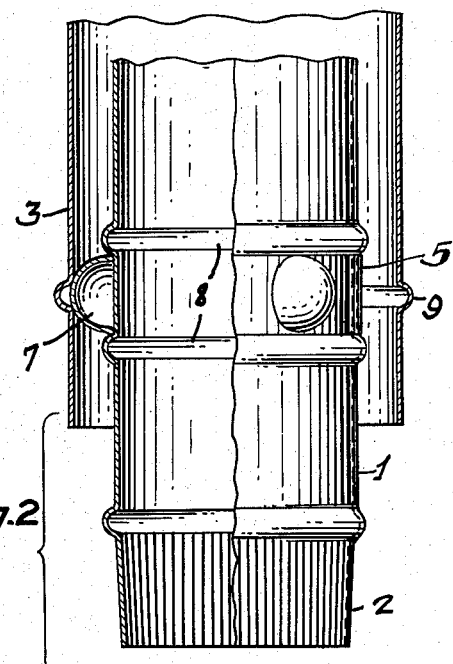
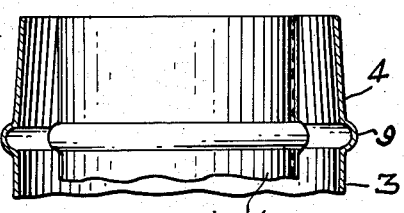
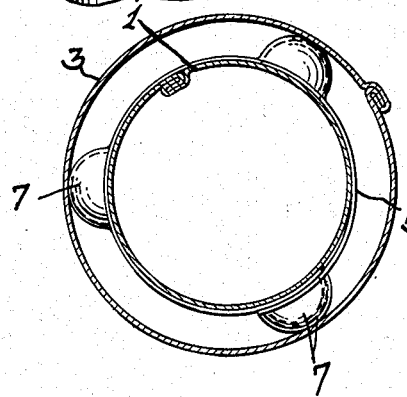
INVENTOR.
William H. Siebels
BY
ATTORNEY Patented June 20, 1950

2,512,116

UNITED STATES PATENT OFFICE 2,512,116

COMPOSITE PIPE STRUCTURE

William H. Siebels, San Francisco, Calif.

Application July 1, 1947, Serial No. 758,351

4 Claims. (Cl. 138—87)

This invention relates to composite pipe constructions of the type embodying inner and outer spaced pipes.

An object of my invention is to provide an improved composite pipe structure comprising an inner core pipe of non-corrosive material, preferably of aluminum, and an outer metallic pipe spaced from the inner pipe, and a number of spacing elements interposed between the pipes for maintaining them in concentrically spaced relationship, whereby an annular air channel is provided between the pipes for ventilation and cooling purposes.

Another object of my invention is to provide an improved composite pipe structure of the kind characterized, embodying novel spacing elements which in assembly, makes it possible to conveniently connect one section to another, and which after assembly, function to maintain the inner and outer pipes in concentric spaced relationship.

Other and further objects of my invention will be pointed out hereinafter, or will be indicated in the appended claims, or will be obvious to one skilled in the art upon an understanding of the present disclosure. For the purpose of this application, I have elected to show herein certain forms and details of a composite pipe structure embodying my invention. It is to be understood however, that the embodiment of my invention shown and described herein is for illustration purposes only and that therefore it is not to be regarded as exhaustive of the variations of the invention.

In the accompanying drawings:

Fig. 1 is a longitudinal sectional view of a number of joined sections of my composite pipe, showing the spacing elements in operative positions between the inner and outer pipes;

Fig. 2 is a side elevation, partly in section, of a number of pipes, showing diagrammatically the manner in which the sections are joined to one another;

Fig. 3 is a sectional view taken on the line 3—3 of Fig. 1; and

Fig. 4 is a perspective view of the spacing element.

As shown in the drawings the joined sections of my composite pipe structure each comprises an inner core pipe 1 having its male end crimped as at 2 and its opposite female end of larger diameter so as to receive the crimped male end of the inner core pipe of an adjoining section. The outer pipe 3 of each section is similarly constructed with a crimped male end 4 and a female end of larger diameter which is adapted to receive the crimped male end of the outer pipe of an adjoining section. Each section is preferably assembled with the crimped male end 2 of the inner core pipe 1 adjacent the larger female end of the outer pipe 3. The crimped male end 2 of the inner pipe points downwardly and fits in the upper female end of the inner pipe 1 of the adjoining lower section, while the reverse is true with respect to the outer pipe, the crimped male end 4 of the outer pipe 3 pointing upwardly to be inserted in the uncrimped female end of the superimposed outer pipe of the section above. By assembling the sections in this manner moisture such as rain, running down the exterior surface of the joined outer pipes 3, and condensates forming inside the inner pipes 1, are carried over the joints so that no moisture or corrosive fluid enters the annular space between the inner and outer pipes.

The inner and outer pipes of each section are maintained in concentric spaced relation by spacing elements 5, thereby providing an annular longitudinal air channel which is particularly suitable for ventilation and cooling purposes. The spacing elements each comprise a substantially circular metal strip 6 of thin somewhat resilient material having a number of spaced substantially hemi-spherical convex and hollow protuberances 7 formed thereon. The ends of each strip is formed with these protuberances 7, and in assembly one of them nests inside the other. The strips 6 of the spacing elements 5 are adapted to extend circumferentially around an inner pipe 1 and closely engage therewith, while the protuberances 7 are adapted to engage with an outer pipe 3 and maintain it in spaced concentric relation to the inner pipe. The two end protuberances 7 of each strip are normally maintained in contacting relation one within the other by reason of the engagement of the outer pipe 3 with the outer protuberance 7, thereby preventing the relative displacement of the two contacting end protuberances. It is to be noted that the length of the radius of each protuberance 7 is substantially equal to the distance between the inner and outer pipes, thereby making it possible for the spacing elements 5 to properly fit between the inner and outer pipes and normally hold them against relative displacement. The inner pipe 1 of each section is formed with pairs of outwardly disposed spaced and parallel annular protuberances 8 between which the spacing elements are positioned. The annular protuberances 8 of each pair are suitably spaced one from the other to provide means for normally preventing the longitudinal displacement of a spacing element 5 located between. In each pipe section one pair of spaced annular protuberances 8 is positioned near the female end of the inner pipe 1 and the other pair of said protuberances is positioned near the mid-portion of said inner pipe. The outer pipe 3 of each section is formed with annular interior grooves 9 near its opposite ends, and in assembly the protuberances 7 of the spacing elements 5 are adapted to engage with the said grooves to prevent the relative displacement of the inner and outer pipes.

In connecting the section one to another the outer pipe 3 is held stationary while the inner pipe 1 is pulled downwardly until the centrally disposed spacing element 5 thereof is carried to a position in which its protuberances 7 engage with the lower annular groove 9 of the outer pipe. When so positioned the protuberances 7 engaging with the groove 9 normally hold the crimped male end 2 of the inner pipe 1 in a downwardly projecting position with respect to the lower end of its associated outer pipe 3. When so positioned the upper female end of the inner pipe 1 of the section below may be easily connected to the exposed male end 2 of the downwardly extended inner pipe 1. When so connected the downwardly extended inner pipe 1 is pushed upwardly while its associated outer pipe is held stationary, thereby causing the upper spacing element 5 on the said inner pipe to be carried to a position opposite the upper annular groove 9 of the said outer pipe, thus effecting an engaging relationship between the protuberances 7 of the upper spacing element 5 with the sides of the upper groove 9. As the inner pipe 1 is thus retracted toward a position entirely inside its associated outer pipe 3, the outer and inner pipes of the section below are moved upwardly to a position in which the upper male end 4 of the lower outer pipe enters and engages with the lower female end of the outer pipe above. When the inner and outer pipes of both sections are thus connected the frictional relation between the spacing elements 5 and the said pipes will normally prevent their longitudinal displacement. It is to be noted that one section may be connected to an adjacent section, although not as conveniently, without first extending the inner pipe of the section above.

Each spacing element 5, being made from a resilient sheet material is adapted to expand and contract when its protuberances 7 are moved out of and into the grooves 9 of an outer pipe, and since the two engaging end protuberances 7 are capable of relative movement there is actually a slight expansion of the spacing element when its protuberances engage with a groove 9 of the outer pipe 3 and a proportionate contraction when it is moved to a disengaging position with the said groove. Each pair of annular protuberances 8 on the inner pipe 1 are of sufficient height to prevent the longitudinal displacement of its associated spacing element when the latter is permitted to expand by the protuberances 7 thereof entering a groove 9 of the outer pipe.

It is contemplated that the strip material from which the spacing elements 5 are subsequently cut be formed with the convex protuberances 7 in the usual manner, and that it then be packaged in rolls for use in the required lengths as needed.

What I claim is:

1. In composite pipe of the kind having inner and outer tubular pipes, a spacing element for normally maintaining the two pipes in annularly spaced relation comprising a split resilient band encircling the inner pipe and having its opposite ends detachably joined together and a plurality of spaced protuberances formed on the band for engaging with the outer pipe.

2. In composite pipe of the kind having inner and outer tubular pipes, a spacing element for normally maintaining the two pipes in annularly spaced and substantially concentric relation comprising an expansible and contractable split band encircling the inner pipe and having a number of spaced protuberances of substantially uniform height positioned in engagement with the outer pipe.

3. In composite pipe of the kind having inner and outer tubular pipes, a spacing element for normally maintaining the two pipes in annularly spaced and substantially concentric relation comprising a resilient metal split band encircling and engaging with the inner pipe and having a plurality of convex hollow spaced protuberances arranged in engaging relation with the outer pipe, the said band having two end protuberances arranged in nesting relation, whereby the ends of the band are maintained in connected but relatively movable relationship.

4. A spacing element adapted for insertion between a pair of spaced tubular walls comprising a resilient split band having a plurality of spaced hollow protuberances of substantially uniform height, the said band having two end protuberances arranged in nesting relation.

WILLIAM H. SIEBELS.

REFERENCES CITED

The following references are of record in the file of this patent:

UNITED STATES PATENTS

| Number | Name | Date |
|---|---|---|
| D. 149,396 | Babin | Apr. 27, 1948 |
| 2,076,210 | Stadtfeld | Apr. 6, 1937 |
| 2,259,433 | Kitto | Oct. 14, 1941 |
| 2,273,393 | Couty | Feb. 17, 1942 |